United States Patent
Murakami et al.

(10) Patent No.: US 12,270,890 B2
(45) Date of Patent: Apr. 8, 2025

(54) OBJECT DETECTION METHOD, OBJECT DETECTION DEVICE, AND OBJECT DETECTION SYSTEM

(71) Applicant: NIPPON TELEGRAPH AND TELEPHONE CORPORATION, Tokyo (JP)

(72) Inventors: Tomoki Murakami, Musashino (JP); Shinya Otsuki, Musashino (JP); Masashi Iwabuchi, Musashino (JP); Tomoaki Ogawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 338 days.

(21) Appl. No.: 17/921,398

(22) PCT Filed: May 15, 2020

(86) PCT No.: PCT/JP2020/019523
§ 371 (c)(1),
(2) Date: Oct. 26, 2022

(87) PCT Pub. No.: WO2021/229812
PCT Pub. Date: Nov. 18, 2021

(65) Prior Publication Data
US 2023/0204750 A1    Jun. 29, 2023

(51) Int. Cl.
*G01S 13/48* (2006.01)
*G01S 7/285* (2006.01)

(52) U.S. Cl.
CPC .............. *G01S 13/48* (2013.01); *G01S 7/285* (2013.01)

(58) Field of Classification Search
CPC ........ G01S 13/003; G01S 13/42; G01S 13/48; G01S 7/285
See application file for complete search history.

(56) References Cited

U.S. PATENT DOCUMENTS

| 2018/0083679 A1* | 3/2018 | Lim ...................... H04B 17/336 |
| 2022/0163651 A1* | 5/2022 | Bengtsson .............. G01S 13/48 |

FOREIGN PATENT DOCUMENTS

| GB | 2044007 A | 10/1980 |
| JP | 2002214333 A | 7/2002 |

OTHER PUBLICATIONS

Eduardo Navarro et al., "Wi-Fi Localization Using RSSI Fingerprinting", California Polytechnic State University, United States of America, http://digitalcommons.calpoly.edu/cpesp/17/ (Aug. 17, 2011).

(Continued)

*Primary Examiner* — Timothy X Pham

(57) ABSTRACT

A wireless transmission device transmits a radio signal with a plurality of beam patterns and outputs transmission beam identifiers corresponding to the beam patterns to an object detection device, a wireless reception device receives the radio signal transmitted by the wireless transmission device with a plurality of beam patterns, measures received signal strength for each of the beam patterns and outputs reception beam identifiers and the received signal strength to the object detection device, and the object detection device detects an object within a detection area on the basis of the transmission beam identifiers, the reception beam identifiers and the received signal strength. This enables device-free object detection by utilizing a beamforming function, so that it is possible to achieve high detection accuracy while preventing increase in cost.

8 Claims, 7 Drawing Sheets

(56) References Cited

OTHER PUBLICATIONS

Wei Wang et al., "Understanding and modeling of wifi signal based human activity recognition", Proceedings of the 21st annual international conference on mobile computing and networking, ACM, Sep. 2015.

* cited by examiner

OBJECT DETECTION METHOD, OBJECT DETECTION DEVICE, AND OBJECT DETECTION SYSTEM

CROSS-REFERENCE TO RELATED APPLICATIONS

This application is a 371 U.S. National Phase of International Application No. PCT/JP2020/019523, filed on May 15, 2020. The entire disclosure of the above application is incorporated herein by reference.

TECHNICAL FIELD

The present invention relates to a device-free object detection method for detecting an object within a communication area as a detection area on the basis of information on a wireless transmission device and a wireless reception device that are capable of performing beamforming, an object detection device, and an object detection system.

BACKGROUND ART

In the field of wireless communication, to stably accommodate continuously increasing radio traffic, communication speed is under improvement using various techniques such as a beamforming technique that controls directivity of radio waves.

Meanwhile, a service that detects a wireless terminal within a communication area and provides position information by utilizing signal strength information (for example, received signal strength (RSS)) of a radio signal is considered. In such a service, for example, a wireless terminal measures RSS of beacon signals transmitted from a plurality of wireless base stations, and a position of the wireless terminal is calculated from the measured plurality of pieces of RSS (see, for example, Non-Patent Literature 1). This method is widely used as a positioning system in an indoor environment in which it is difficult to utilize a global positioning system (GPS).

Further, a device-free detection method for detecting an object (a target such as a human) that does not hold a special device such as an antenna is known (see, for example, Non-Patent Literature 2). In the device-free detection method, whether or not an object exists and a state of the object are detected from change characteristics of RSS measured by a wireless base station and a wireless terminal fixed within a detection area or around the detection area.

CITATION LIST

Non-Patent Literature

Non-Patent Literature 1: Navarro Eduardo, 2011, "Wi-Fi Localization Using RSSI Fingerprinting", California Polytechnic State University, United States of America, http://digitalcommons.calpoly.edu/cpesp/17/(17 Aug. 2011)

Non-Patent Literature 2: Wang, Wei, et al, "Understanding and modeling of wifi signal based human activity recognition", Proceedings of the 21st annual international conference on mobile computing and networking, ACM, 2015

SUMMARY OF THE INVENTION

Technical Problem

A device-free detection method has a problem in detection accuracy compared to a method for detecting an object holding a special device such as an antenna, because change in a propagation environment is typically small. While it is possible to solve the problem by increasing the number of provided wireless base stations and wireless terminals, this causes a problem of increase in cost.

The present invention is directed to providing an object detection method that is capable of achieving high detection accuracy while preventing increase in cost by using a beamforming function, which is utilized in a wireless communication system, in device-free object detection, an object detection device and an object detection system.

Means for Solving the Problem

The present invention is an object detection method for detecting an object within a detection area by an object detection device on the basis of information output by a wireless transmission device and a wireless reception device each having a beamforming function, in which the wireless transmission device transmits a radio signal with a plurality of beam patterns determined in advance and outputs transmission beam identifiers corresponding to the beam patterns to the object detection device, the wireless reception device receives the radio signal transmitted by the wireless transmission device with a plurality of beam patterns determined in advance, measures received signal strength for each of the beam patterns and outputs reception beam identifiers and the received signal strength corresponding to the beam patterns to the object detection device, and the object detection device is connected to the wireless transmission device and the wireless reception device and detects the object within the detection area on the basis of the transmission beam identifiers input from the wireless transmission device, and the reception beam identifiers and the received signal strength corresponding to the reception beam identifiers input from the wireless reception device.

Further, the present invention is an object detection device that detects an object within a detection area on the basis of information output by a wireless transmission device and a wireless reception device each having a beamforming function, the object detection device including an analysis unit configured to receive, from the wireless transmission device that transmits a radio signal with a plurality of beam patterns determined in advance, input of transmission beam identifiers corresponding to the beam patterns, receive, from the wireless reception device that receives the radio signal transmitted by the wireless transmission device with a plurality of beam patterns determined in advance and measures received signal strength for each of the beam patterns, input of reception beam identifiers and the received signal strength corresponding to the beam patterns, and detect the object within the detection area on the basis of the transmission beam identifiers input from the wireless transmission device, and the reception beam identifiers and the received signal strength corresponding to the reception beam identifiers input from the wireless reception device.

Further, the present invention is an object detection system including an object detection device that detects an object within a detection area on the basis of information output by a wireless transmission device and a wireless reception device each having a beamforming function, in which the wireless transmission device transmits a radio signal with a plurality of beam patterns determined in advance and outputs transmission beam identifiers corresponding to the beam patterns to the object detection device, the wireless reception device receives the radio signal transmitted by the wireless transmission device with a plurality of beam patterns determined in advance, measures received signal strength for each of the beam patterns and outputs reception beam identifiers and the received signal strength corresponding to the beam patterns to the object detection device, and the object detection device is connected to the wireless transmission device and the wireless reception device and detects the object within the detection area on the basis of the transmission beam identifiers input from the wireless transmission device, and the reception beam identifiers and the received signal strength corresponding to the reception beam identifiers input from the wireless reception device.

Effects of the Invention

An object detection method, an object detection device and an object detection system according to the present invention can achieve high detection accuracy while preventing increase in cost by using a beamforming function, which is utilized in a wireless communication system, in device-free object detection.

DESCRIPTION OF EMBODIMENTS

An embodiment of an object detection method, an object detection device and an object detection system according to the present invention will be described below with reference to the drawings.

Figure 1:
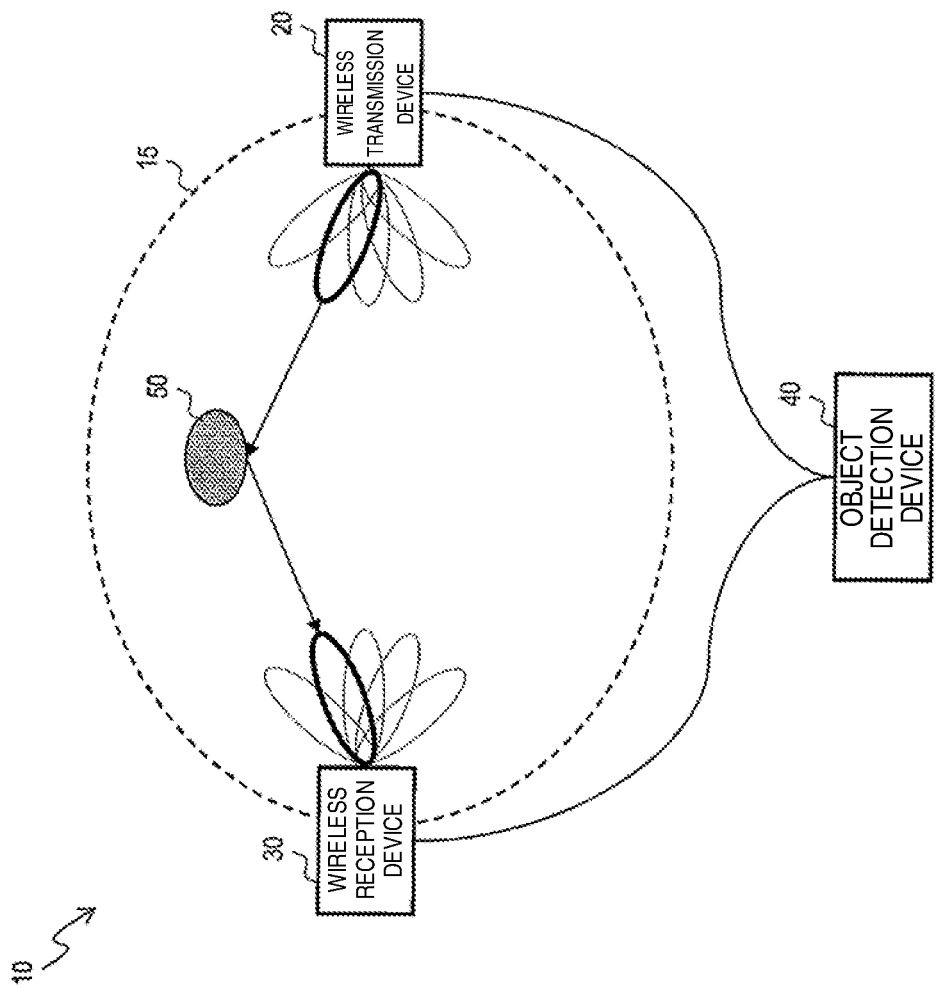
FIG. 1 is a view illustrating a configuration example of an object detection system.

FIG. 1 illustrates a configuration example of an object detection system 10 according to the present embodiment. In FIG. 1, the object detection system 10 includes a wireless transmission device 20, a wireless reception device 30 and an object detection device 40. Note that it is assumed that the wireless transmission device 20 and the wireless reception device 30 are provided within a detection area 15 or around the detection area 15. It is further assumed that an object 50 to be detected exists within the detection area 15.

Here, the object detection system 10 according to the present embodiment utilizes a beamforming function for wireless communication that is employed in a wireless communication system using a high-frequency band such as a millimeter wave, in detection of an object. The beamforming function is a function of forming radio wave radiation characteristics having an arbitrary shape and can achieve an arbitrary beam pattern by adjusting strength of radio waves in a specific direction. The beam pattern is radiation characteristics of radio waves transmitted from the wireless transmission device 20 (or radio waves received by the wireless reception device 30).

The wireless transmission device 20 transmits a radio signal into the air with a plurality of beam patterns determined in advance. Further, the wireless transmission device 20 outputs transmission beam identifiers (referred to as transmission beam IDs) corresponding to the beam patterns to the object detection device 40. The transmission beam ID is an identifier allocated for each shape of the beam pattern and is different for each transmission beam ID.

The wireless reception device 30 receives the radio signal transmitted by the wireless transmission device 20 with a plurality of beam patterns determined in advance and measures received signal strength RSS. Then, the wireless reception device 30 outputs reception beam identifiers (referred to as reception beam IDs) and the RSS corresponding to the beam patterns to the object detection device 40. The reception beam ID is an identifier allocated for each shape of the beam pattern in a similar manner to the transmission beam ID and is different for each reception beam ID.

The object detection device 40 is connected to the wireless transmission device 20 and the wireless reception device 30 in a wired or wireless manner. Further, the object detection device 40 detects an object on the basis of the transmission beam ID input from the wireless transmission device 20 and the reception beam ID and the RSS input from the wireless reception device 30. Specifically, the object detection device 40 outputs whether or not the object 50 exists or a location of the object 50 from map information of the detection area 15, locations where the wireless transmission device 20 and the wireless reception device 30 are provided, information on a beam shape, or the like, stored as prior information. Note that the map information of the detection area 15 is layout information of the detection area 15 and is planar information including distance information.

In this manner, the object detection system 10 according to the present embodiment can estimate whether or not the object 50 exists within the detection area 15 and the location of the object 50.

Note that while in the example in FIG. 1, one wireless transmission device 20 and one wireless reception device 30 are provided, a plurality of wireless transmission devices 20 and a plurality of wireless reception devices 30 may be provided. In this case, the number of the wireless transmission devices 20 may be different from the number of wireless reception devices 30. Further, while in FIG. 1, an example where one object 50 to be detected exists within the detection area 15, a plurality of objects may exist within the detection area 15.

Figure 2:
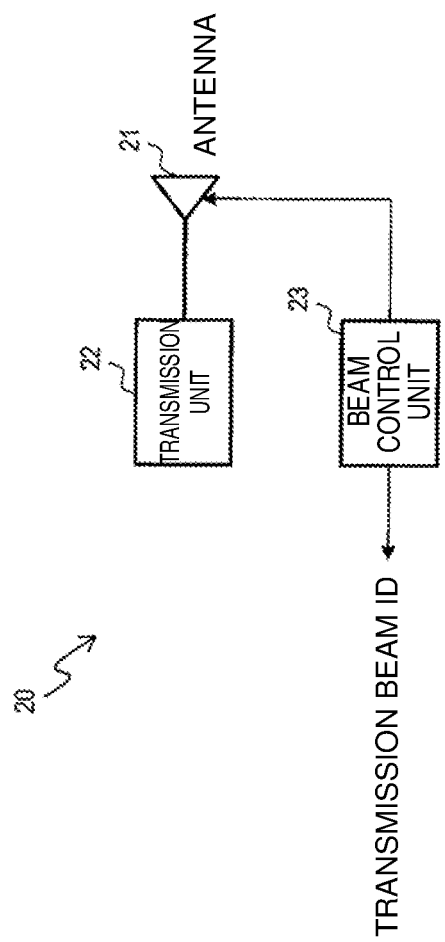
FIG. 2 is a view illustrating a configuration example of a wireless transmission device.

FIG. 2 illustrates a configuration example of the wireless transmission device 20 according to the present embodiment. In FIG. 2, the wireless transmission device 20 includes an antenna 21, a transmission unit 22 and a beam control unit 23. Note that while a wireless transmission device that is actually operated not as a system dedicated for object detection but as a communication system includes components for performing data communication in addition to the components in FIG. 2, in the present embodiment, only components relating to object detection are described.

The antenna 21 is, for example, constituted with an array antenna including a plurality of antennas and has a beamforming function for forming a beam pattern designated from the beam control unit 23. For example, in a case of an array antenna, strength of radio waves in a specific direction can be adjusted by controlling phases and amplitudes when a transmission signal output from the transmission unit 22 is input to the antennas. In this manner, an arbitrary beam pattern can be formed. Further, the antenna 21 converts the transmission signal output from the transmission unit 22 into radio waves and transmits the radio waves into the air with the beam pattern designated by the beam control unit 23.

The transmission unit 22 modulates transmission data to a transmission signal for communication or a transmission signal for measurement and outputs the transmission signal to the antenna 21. Here, while the transmission signal for communication may be utilized in object detection, it is preferable to utilize the transmission signal for measurement determined in advance.

The beam control unit 23 designates one beam pattern among a plurality of beam patterns to the antenna 21 and outputs a transmission beam ID corresponding to the beam pattern designated to the antenna 21 to the object detection device 40. Here, the beam control unit 23 may sequentially designate a plurality of beam patterns to the antenna 21 or may designate only a beam pattern set in advance to the antenna 21.

In this manner, the wireless transmission device 20 according to the present embodiment transmits a signal with a beam pattern designated by the beam control unit 23 and notifies the object detection device 40 of a transmission beam ID corresponding to the beam pattern with which the signal is transmitted. This enables the object detection device 40 to confirm which beam pattern among a plurality of beam patterns is used to transmit the signal.

Figure 3:
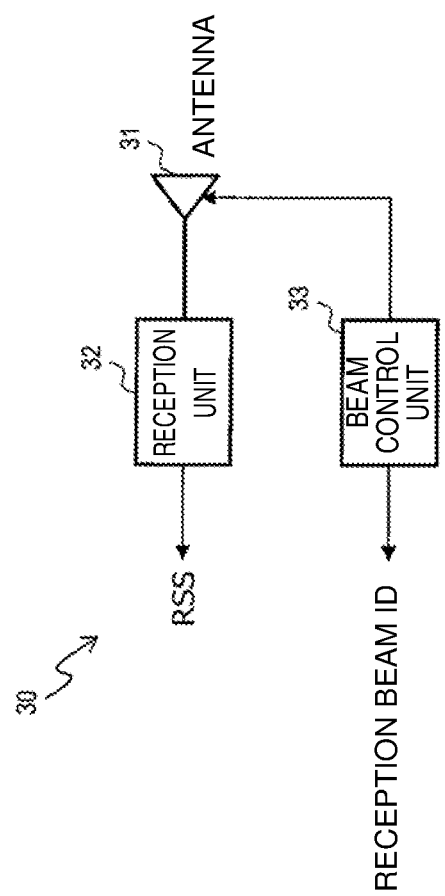
FIG. 3 is a view illustrating a configuration example of a wireless reception device.

FIG. 3 illustrates a configuration example of the wireless reception device 30 according to the present embodiment. In FIG. 3, the wireless reception device 30 includes an antenna 31, a reception unit 32 and a beam control unit 33. Note that in a similar manner to FIG. 2, while a wireless reception device that is actually operated not as a system dedicated for object detection but as a communication system includes components for performing data communication in addition to the components in FIG. 3, in the present embodiment, only components relating to object detection are described.

The antenna 31 is, for example, constituted with an array antenna including a plurality of antennas in a similar manner to the antenna 21 of the wireless transmission device 20 and has a beamforming function for forming a beam pattern designated from the beam control unit 33. Further, the antenna 31 converts radio waves received with the beam pattern designated by the beam control unit 33 into a received signal and outputs the received signal to the reception unit 32.

The reception unit 32 demodulates a received signal for communication or a received signal for measurement input from the antenna 31 to received data. Further, the reception unit 32 measures received signal strength RSS of the received signal and outputs a measurement result of the received signal strength RSS to the object detection device 40.

The beam control unit 33 designates one beam pattern among a plurality of beam patterns to the antenna 31 and outputs a reception beam ID corresponding to the beam pattern designated to the antenna 31 to the object detection device 40. Here, in a similar manner to the beam control unit 23, the beam control unit 33 may sequentially designate a plurality of beam patterns to the antenna 31 or may designate only a beam pattern set in advance to the antenna 31.

In this manner, the wireless reception device 30 according to the present embodiment receives the signal with the beam pattern designated by the beam control unit 33 and measures received signal strength RSS. Then, the wireless reception device 30 notifies the object detection device 40 of the reception beam ID corresponding to the beam pattern with which the signal is received, and the received signal strength RSS when the signal is received with the beam pattern. This enables the object detection device 40 to confirm which beam pattern among a plurality of beam patterns is used to receive the signal from the reception beam ID and acquire received signal strength RSS corresponding to the reception beam ID. Here, the object detection device 40 receives from the wireless transmission device 20, the transmission beam ID of the wireless transmission device 20 when the wireless reception device 30 measures the received signal strength RSS, so that the object detection device 40 can acquire the received signal strength RSS for each combination of the transmission beam ID and the reception beam ID.

Figure 4:
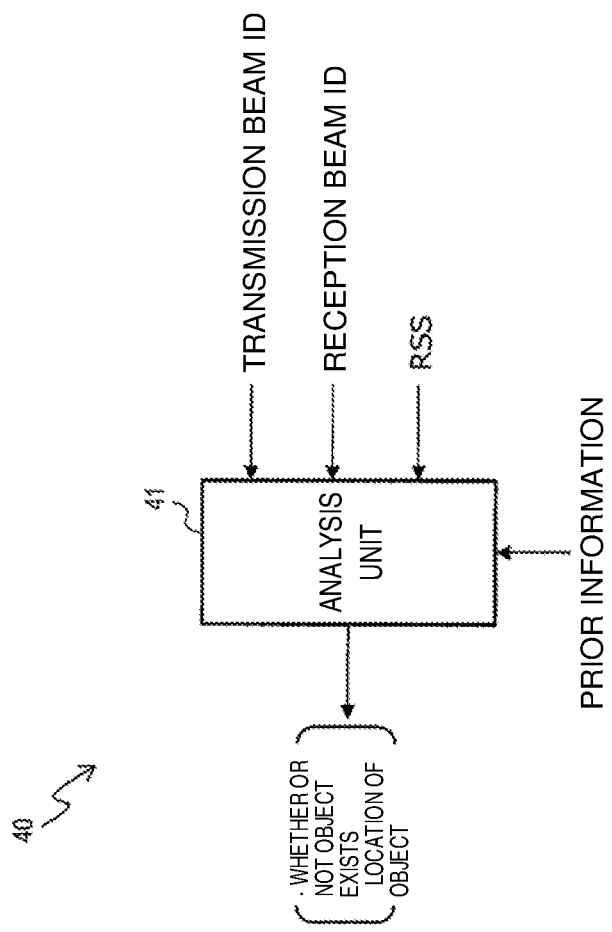
FIG. 4 is a view illustrating a configuration example of an object detection device.

FIG. 4 illustrates a configuration example of the object detection device 40 according to the present embodiment. In FIG. 4, the object detection device 40 includes an analysis unit 41. Here, the object detection device 40 holds map information of the detection area 15, information on locations where the wireless transmission device 20 and the wireless reception device 30 are provided, information on beam patterns corresponding to the transmission beam ID and the reception beam ID, or the like, in an external or internal storage device as prior information.

The analysis unit 41 analyzes whether or not the object 50 exists, a location of the object 50, or the like, sequentially on the basis of the transmission beam ID input from the wireless transmission device 20, the reception beam ID and the received signal strength RSS input from the wireless reception device 30 with reference to the above-described prior information. For example, the analysis unit 41 controls the wireless transmission device 20 and the wireless reception device 30 to perform premeasurement in a state where there is no object 50 to be detected and measures received signal strength RSS for each combination of the transmission beam ID and the reception beam ID. In a similar manner, the analysis unit 41 performs main measurement for detecting whether or not the object 50 exists to measure received signal strength RSS for each combination of the transmission beam ID and the reception beam ID. Then, the analysis unit 41 compares the premeasurement result with the main measurement result and outputs an analysis result as to whether or not the object 50 exists, a location of the object 50, or the like, to outside. Here, an output destination of the analysis result may be, for example, a monitor screen of a system operator or may be a system administration device, or the like, connected via a network. Note that a specific method for comparing the premeasurement result with the main measurement result will be described later.

In this manner, the object detection device 40 according to the present embodiment can detect whether or not the object 50 exists and a location of the object 50 on the basis of the transmission beam ID input from the wireless transmission device 20, and the reception beam ID and the RSS input from the wireless reception device 30.

Figure 5:
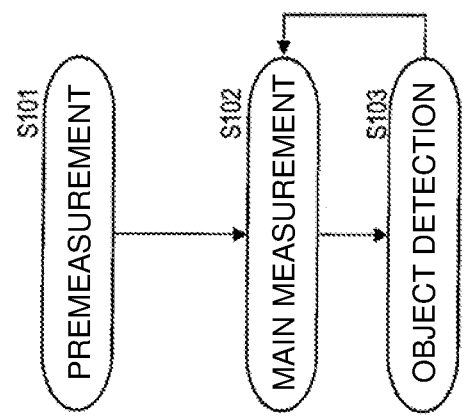
FIG. 5 is a view illustrating an example of processing procedure of an object detection method.

FIG. 5 illustrates an example of processing procedure of the object detection method according to the present embodiment. Note that the processing explained in FIG. 5 is executed by the wireless transmission device 20, the wireless reception device 30 and the object detection device 40 explained from FIG. 1 to FIG. 4.

In step S101, the object detection device 40 performs premeasurement. In the premeasurement, the RSS is measured for each combination of the transmission beam ID of the wireless transmission device 20 and the reception beam ID of the wireless reception device 30 in a state where there is no object to be detected. Here, the RSS may be measured for all combinations of the transmission beam IDs of the wireless transmission device 20 and the reception beam IDs of the wireless reception device 30 or may be measured for combinations determined in advance. Note that a measurement example will be described later using FIG. 6.

In step S102, the object detection device 40 performs main measurement. In the main measurement, in a similar manner to the premeasurement, the RSS is measured for each combination of the transmission beam ID of the wireless transmission device 20 and the reception beam ID of the wireless reception device 30.

In step S103, the object detection device 40 detects whether or not the object 50 exists and a location of the object 50 on the basis of the premeasurement result in step S101 and the main measurement result in step S102. Specifically, the object detection device 40 calculates a difference between the premeasurement result in step S101 and the main measurement result in step S102 and determines that an object exists in a case where the difference is equal to or greater than a threshold. Note that the difference is calculated for each combination of the transmission beam ID and the reception beam ID, and an absolute value of a difference between the received signal strength RSS of the premeasurement result and the received signal strength RSS of the main measurement result in the same combination becomes the difference. Further, the object detection device 40 determines that an object exists in a case where a difference in any of combinations of the transmission beam IDs and the reception beam IDs is equal to or greater than a threshold set in advance. Inversely, the object detection device 40 determines that an object does not exist in a case where the difference is not equal to or greater than the threshold.

For example, it is assumed that in a combination of the transmission beam ID=n and the reception beam ID=m, the received signal strength of the premeasurement result is RSS-nm(A) and the received signal strength of the main measurement result is RSS-nm(B). In this case, a difference (nm) in the combination of the transmission beam ID=n and the reception beam ID=m can be expressed using the following expression (1).

$$\text{Difference (nm)}=|(\text{RSS-nm}(A))-(\text{RSS-nm}(B))| \quad (1)$$

Here, |x| is an absolute value of x.

Further, whether or not the expression (1) satisfies the following expression is determined.

$$\text{Difference (nm)} \geq \text{threshold} \quad (2)$$

$$\text{Difference (nm)} < \text{threshold} \quad (3)$$

In a case where the difference (nm) satisfies the expression (2), it is determined that the object 50 exists in the combination of the transmission beam ID=n and the reception beam ID=m.

Inversely, in a case where the difference (nm) satisfies the expression (3), it is determined that the object 50 does not exist in the combination of the transmission beam ID=n and the reception beam ID=m.

Here, a beam pattern is determined for each combination of the transmission beam ID and the reception beam ID, so that it is possible to detect a location of the object 50 from the beam pattern when the object 50 is detected.

Further, the threshold is a value set in advance and is set at a value at which object detection can be performed with high accuracy on the basis of a result obtained through premeasurement in the present embodiment. For example, the threshold is set as in expression (4) by determining a predetermined degree of variability (such as, for example, 10%) for a measurement value obtained through premeasurement.

$$\text{Threshold}=(\text{measurement value of premeasurement})\times(\text{degree of variability}) \quad (4)$$

Alternatively, the threshold may be set by results obtained by performing premeasurement a plurality of times being subjected to statistical processing.

Further, while in the above-described example, the threshold is set for each combination of the transmission beam ID and the reception beam ID, a threshold common to all combinations may be set.

In FIG. 5, the object detection device 40 can detect a dynamic object that temporally moves by repeating the processing in step S102 and step S103. Specifically, the object detection device 40 can detect a movement direction, movement speed, or the like, of the object 50.

Figure 6:
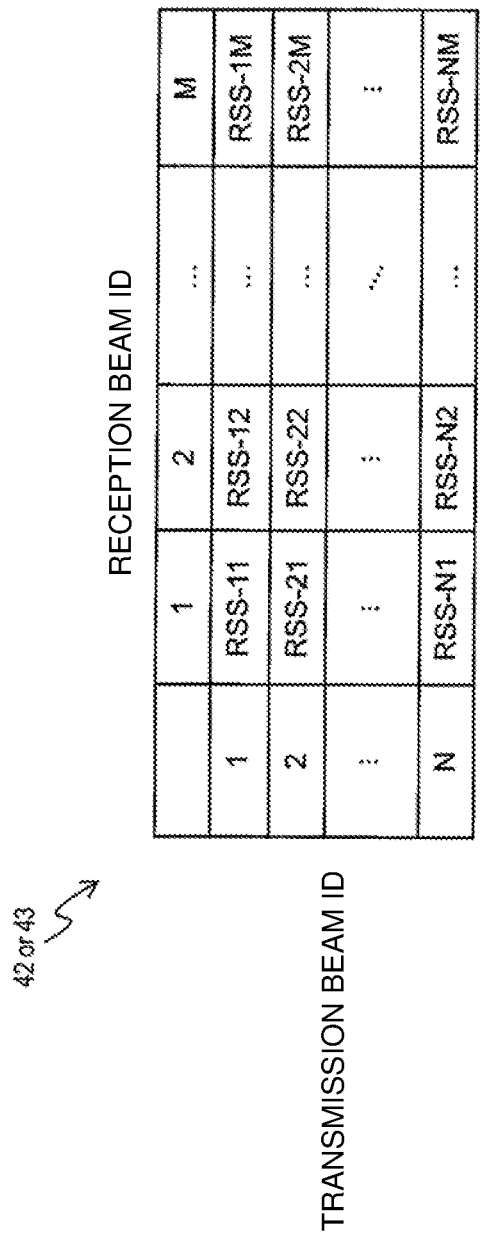
FIG. 6 is a view illustrating an example of a database for premeasurement results or main measurement results.

FIG. 6 illustrates an example of a database for the premeasurement results or the main measurement results. In FIG. 6, a database for the premeasurement results in a state where there is no object in step S101 explained in FIG. 5 is set as a database 42 (premeasurement database), and a database for the main measurement results in step S102 is set as a database 43 (main measurement database). Note that FIG. 6 indicates transmission beam IDs from 1 to N (where N is a positive integer) in a row direction and indicates reception beam IDs from 1 to M (where M is a positive integer) in a column direction.

Here, the wireless transmission device 20 and the wireless reception device 30 sequentially set beam patterns respectively corresponding to the transmission beam IDs and the reception beam IDs and measure RSS for each combination of the transmission beam ID and the reception beam ID. Further, the object detection device 40 measures RSS for each combination of the transmission beam ID and the reception beam ID respectively for the premeasurement and the main measurement. By this means, the database 42 of the premeasurement results and the database 43 of the main measurement results as illustrated in FIG. 6 can be obtained.

In the example in FIG. 6, a premeasurement result (or a main measurement result) in a combination of the transmission beam ID=1 and the reception beam ID=1 is RSS-11. In a similar manner, a premeasurement result (or a main measurement result) in a combination of the transmission beam ID=1 and the reception beam ID=2 is RSS-12, and a premeasurement result (or a main measurement result) in a combination of the transmission beam ID=1 and the reception beam ID=M is RSS-1M.

In this manner, the object detection device 40 creates the database 42 or the database 43 of the RSS of the premeasurement results or the main measurement results for N×M combinations of 1 to N transmission beam IDs and 1 to M reception beam IDs. Further, as explained in FIG. 5, the object detection device 40 detects whether or not the object 50 exists and a location of the object 50 by calculating a difference on the basis of the database 42 of the premeasurement results in a state where there is no object to be detected and the database 43 of the main measurement results.

Figure 7:
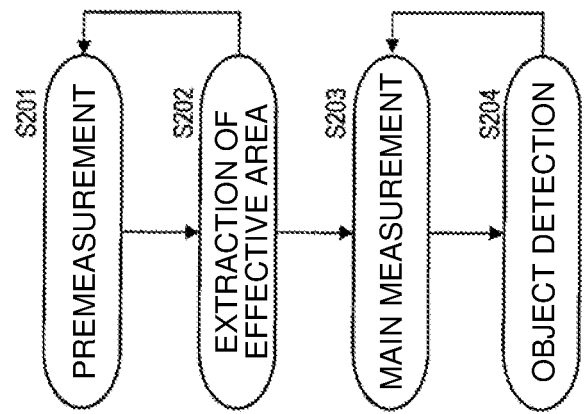
FIG. 7 is a view illustrating an example of processing procedure of a high-accuracy object detection method.

FIG. 7 illustrates an example of processing procedure of a high-accuracy object detection method. Note that the processing explained in FIG. 7 is executed by the wireless transmission device 20, the wireless reception device 30 and the object detection device 40 explained from FIG. 1 to FIG. 4 in a similar manner to the processing explained in FIG. 5. In FIG. 7, object detection accuracy is improved by adding processing of extracting an effective area to the processing in FIG. 5 and setting an effective area in which the object 50 can be reliably detected.

Here, the effective area is an area in which an object can be detected with high accuracy in the detection area 15. In the processing in FIG. 7, two types of premeasurement are performed.

The first type of premeasurement is premeasurement to be performed in a state where there is no object to be detected as explained in FIG. 5. Further, the database 42 of the premeasurement results as explained in FIG. 6 is created. Here, premeasurement results in a state where there is no object to be detected are set as first premeasurement results, and the database 42 at this time is set as a database 42(A) (first premeasurement database).

The second type of premeasurement is premeasurement to be performed by dividing the detection area 15 into mesh-like areas from the map information of the detection area 15 stored as the prior information and disposing an object for learning in each of the mesh-like areas. Here, the premeasurement results when the objects for learning are disposed and premeasurement is performed are set as second premeasurement results, and the database 42 at this time is set as a database 42(B) (second premeasurement database). Note that the database 42(B) is obtained for each of the mesh-like areas in which the objects for learning are disposed.

Further, the object detection device 40 creates a database of effective areas on the basis of the first premeasurement results and the second premeasurement results in a state where the objects for learning are provided. Specifically, for example, mesh-like areas in which change in a difference between the database 42(A) of the first premeasurement results and the database 42(B) of the second premeasurement results is equal to or greater than a threshold for detecting whether or not an object exists, are set as effective areas. Then, the database 42(A) of the first premeasurement results set as the effective areas is registered as a database 42(C) of the effective areas.

Processing in FIG. 7 will be described below.

In step S201, in a similar manner to step S101 in FIG. 5, the object detection device 40 performs premeasurement in a state where there is no object to be detected and creates the database 42(A) as the first premeasurement results.

In step S202, the object detection device 40 extracts an effective area. As described above, the effective area is extracted by respectively disposing the objects for learning in the mesh-like areas and performing premeasurement, and the database 42(B) is created as the second premeasurement results. The object detection device 40 then creates and registers the database 42(C) of the effective areas on the basis of the first premeasurement results and the second premeasurement results in step S201.

In step S203, the object detection device 40 performs main measurement in a similar manner to step S102 in FIG. 5 and creates the database 43 as explained in FIG. 6.

In step S204, the object detection device 40 detects whether or not the object 50 exists in the effective area and a location of the object 50 on the basis of the database 42(C) of the effective areas registered in step S202 and the database 43 of the main measurement results in step S203. While a specific detection method is the same as the method in step S103, the object detection device 40 calculates a difference between the database 42(C) of the effective areas and the database 43 of the main measurement results in step S203 and determines that an object exists in a case where the difference is equal to or greater than the threshold.

In this manner, object detection is performed with reference to only the database 42(C) of the effective areas in the processing in FIG. 7, and thus, object detection can be performed with higher accuracy than the processing in FIG. 5.

A method for outputting a position of an object as well as detecting an object will be described next. A position of the object 50 can be detected by extending the detection method explained in FIG. 7.

Specifically, the object detection device 40 obtains a difference between the database 42(A) of the first premeasurement results and the database 42(B) of the second premeasurement results when an object for learning is disposed in each mesh-like area. The object detection device 40 then stores a combination of the transmission beam ID and the reception beam ID for which an absolute value of the difference is the greatest (that is, change is the largest) and a position of the object for learning upon measurement (a position of the mesh-like area) in association with each other. As a result of this, a position of an area for the combination of the transmission beam ID and the reception beam ID for which change is the largest becomes the position of the object 50. In this manner, a position database is created by disposing the objects for learning in all mesh-like areas, performing the above-described premeasurement and associating the combination of the transmission beam ID and the reception beam ID for which change is the largest with the position of the area at that time.

The object detection device 40 then performs main measurement in a state where the object 50 exists within the detection area 15 and calculates a combination of the transmission beam ID and the reception beam ID for which an absolute value of a difference between the database 43 of the main measurement results and the database 42(A) of the first premeasurement results is the largest. Then, the object detection device 40 acquires a position of an area corresponding to the calculated combination of the transmission beam ID and the reception beam ID from the position database and outputs the acquired position of the area as the position of the object 50.

Note that while in the above-described embodiment, the wireless transmission device 20 and the wireless reception device 30 execute the respective kinds of processing using one frequency channel, the wireless transmission device 20 and the wireless reception device 30 may execute the respective kinds of processing using a plurality of frequency channels. This enables further improvement of detection accuracy. In this case, a plurality of object detection results can be obtained for each frequency channel, so that detection accuracy is improved by the plurality of detection results being subjected to, for example, statistical processing.

Further, in a case where a position of the effective area is different for each frequency channel, a plurality of effective areas for each frequency channel can be used in combination, so that it is possible to expand an effective area in which detection can be performed with high accuracy.

Further, in a case where there is a combination of the transmission beam ID and the reception beam ID that is not designated as an effective area, by omitting measurement of the combination, it is possible to accelerate detection processing.

As described above, the object detection method, the object detection device and the object detection system according to the present invention can achieve high detection accuracy while preventing increase in cost by using a beamforming function, which is utilized in a wireless communication system, in device-free object detection.

REFERENCE SIGNS LIST

10 Object detection system
15 Detection area

20 Wireless transmission device
21 Antenna
22 Transmission unit
23 Beam control unit
30 Wireless reception device
31 Antenna
32 Reception unit
33 Beam control unit
40 Object detection device
41 Analysis unit
50 Object

The invention claimed is:

1. An object detection method for detecting an object within a detection area by an object detection device on a basis of information output by a wireless transmission device and a wireless reception device each having a beamforming function, wherein
the wireless transmission device transmits a radio signal with a plurality of beam patterns determined in advance and outputs transmission beam identifiers corresponding to the beam patterns to the object detection device,
the wireless reception device receives the radio signal transmitted by the wireless transmission device with a plurality of beam patterns determined in advance, measures received signal strength for each of the beam patterns and outputs reception beam identifiers and the received signal strength corresponding to the beam patterns to the object detection device, and
the object detection device is connected to the wireless transmission device and the wireless reception device and detects the object within the detection area on a basis of the transmission beam identifiers input from the wireless transmission device, and the reception beam identifiers and the received signal strength corresponding to the reception beam identifiers input from the wireless reception device.

2. The object detection method according to claim 1, wherein the object detection device
creates a database of received signal strength corresponding to each combination of the transmission beam identifiers and the reception beam identifiers,
holds the database for premeasurement in a case where there is no object within the detection area as a premeasurement database,
holds the database for main measurement in which the object within the detection area is detected as a main measurement database, and
compares the received signal strength in the premeasurement database with the received signal strength in the main measurement database for each combination of the transmission beam identifiers and the reception beam identifiers to detect the object within the detection area.

3. The object detection method according to claim 1, wherein the object detection device
creates a database of received signal strength corresponding to each combination of the transmission beam identifiers and the reception beam identifiers,
holds the database for premeasurement in a case where there is no object within the detection area as a first premeasurement database,
holds, as a second premeasurement database, the database for premeasurement in a case where an object for learning is disposed in each mesh-like area obtained by dividing the detection area into mesh-like areas and sets the mesh-like area for which an absolute value of a difference between the received signal strength in the first premeasurement database and the received signal strength in the second premeasurement database is equal to or greater than a threshold determined in advance, as an effective area,
holds the database for main measurement in which the object within the detection area is detected as a main measurement database, and
compares the received signal strength in the first premeasurement database with the received signal strength in the main measurement database, which are set for the effective area, for each combination of the transmission beam identifiers and the reception beam identifiers to detect the object within the detection area.

4. An object detection device that detects an object within a detection area on a basis of information output by a wireless transmission device and a wireless reception device each having a beamforming function,
the object detection device comprising an analysis unit configured to
receive, from the wireless transmission device that transmits a radio signal with a plurality of beam patterns determined in advance, input of transmission beam identifiers corresponding to the beam patterns,
receive, from the wireless reception device that receives the radio signal transmitted by the wireless transmission device with a plurality of beam patterns determined in advance and measures received signal strength for each of the beam patterns, input of reception beam identifiers and the received signal strength corresponding to the beam patterns, and
detect the object within the detection area on a basis of the transmission beam identifiers input from the wireless transmission device, and the reception beam identifiers and the received signal strength corresponding to the reception beam identifiers input from the wireless reception device.

5. The object detection device according to claim 4, wherein the analysis unit
creates a database of received signal strength corresponding to each combination of the transmission beam identifiers and the reception beam identifiers,
holds the database for premeasurement in a case where there is no object within the detection area as a premeasurement database,
holds the database for main measurement in which the object within the detection area is detected as a main measurement database, and
compares the received signal strength in the premeasurement database with the received signal strength in the main measurement database for each combination of the transmission beam identifiers and the reception beam identifiers to detect the object within the detection area.

6. The object detection device according to claim 4, wherein the analysis unit
creates a database of received signal strength corresponding to each combination of the transmission beam identifiers and the reception beam identifiers,
holds the database for premeasurement in a case where there is no object within the detection area as a first premeasurement database,
holds, as a second premeasurement database, the database for premeasurement in a case where an object for learning is disposed in each mesh-like areas obtained by dividing the detection area into mesh-like areas and sets the mesh-like area for which an absolute value of a difference between the received signal strength in the first premeasurement database and the received signal strength in the second premeasurement database is equal to or greater than a threshold determined in advance, as an effective area, holds the database for main measurement in which the object within the detection area is detected as a main measurement database, and compares the received signal strength in the first premeasurement database with the received signal strength in the main measurement database, which are corresponding to the effective area, for each combination of the transmission beam identifiers and the reception beam identifiers to detect the object within the detection area.

7. An object detection system including an object detection device that detects an object within a detection area on a basis of information output by a wireless transmission device and a wireless reception device each having a beamforming function, wherein the wireless transmission device transmits a radio signal with a plurality of beam patterns determined in advance and outputs transmission beam identifiers corresponding to the beam patterns to the object detection device, the wireless reception device receives the radio signal transmitted by the wireless transmission device with a plurality of beam patterns determined in advance, measures received signal strength for each of the beam patterns and outputs reception beam identifiers and the received signal strength corresponding to the beam patterns to the object detection device, and the object detection device is connected to the wireless transmission device and the wireless reception device and detects the object within the detection area on a basis of the transmission beam identifiers input from the wireless transmission device, and the reception beam identifiers and the received signal strength corresponding to the reception beam identifiers input from the wireless reception device.

8. The object detection system according to claim 7, wherein the object detection device creates a database of received signal strength corresponding to each combination of the transmission beam identifiers and the reception beam identifiers, holds the database for premeasurement in a case where there is no object within the detection area as a premeasurement database, holds the database for main measurement in which the object within the detection area is detected as a main measurement database, and compares the received signal strength in the premeasurement database with the received signal strength in the main measurement database for each combination of the transmission beam identifiers and the reception beam identifiers to detect the object within the detection area.

* * * * *